(12) United States Patent
Fischer et al.

(10) Patent No.: US 11,336,657 B2
(45) Date of Patent: May 17, 2022

(54) SECURING COMMUNICATION WITHIN A COMMUNICATION NETWORK USING MULTIPLE SECURITY FUNCTIONS

(71) Applicant: SIEMENS AKTIENGESELLSCHAFT, Munich (DE)

(72) Inventors: Kai Fischer, Baldham (DE); Daniela Friedrich, Munich (DE); Markus Heintel, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 147 days.

(21) Appl. No.: 16/610,937

(22) PCT Filed: May 9, 2018

(86) PCT No.: PCT/EP2018/061970
§ 371 (c)(1),
(2) Date: Nov. 5, 2019

(87) PCT Pub. No.: WO2018/215209
PCT Pub. Date: Nov. 29, 2018

(65) Prior Publication Data
US 2021/0218752 A1 Jul. 15, 2021

(30) Foreign Application Priority Data

May 23, 2017 (DE) ...................... 10 2017 208 735.8

(51) Int. Cl.
*H04L 29/06* (2006.01)
*H04L 29/08* (2006.01)
(Continued)

(52) U.S. Cl.
CPC .......... *H04L 63/123* (2013.01); *H04L 9/0833* (2013.01); *H04L 63/0478* (2013.01); *H04L 67/12* (2013.01); *H04L 9/3242* (2013.01)

(58) Field of Classification Search
CPC ... H04L 63/123; H04L 63/0478; H04L 67/12; H04L 9/0833; H04L 9/3242; H04L 29/06; H04L 29/08; H04L 9/08
See application file for complete search history.

(56) References Cited

U.S. PATENT DOCUMENTS 7,389,529 B1   6/2008 Enderwick et al.
8,776,166 B1 *  7/2014 Erickson ............. H04L 12/4633
                                                    726/1
(Continued)

FOREIGN PATENT DOCUMENTS

CN    102106135 A    6/2011
CN    104539573 A    4/2015
(Continued)

OTHER PUBLICATIONS

Saputro et al; "A survey of routing protocols for smart grid communications"; ELSEVIER Science Publishers B.V. vol. 56; No. 11; pp. 2742-2771; ISSN: 1389-1286; DOI 10.1016/J.COMNET. 2012,03,027; XP028501836; Abstract, Section 1, 4, 7; 2012.
(Continued)

*Primary Examiner* — Quazi Farooqui
(74) *Attorney, Agent, or Firm* — Schmeiser, Olsen & Watts LLP

(57) ABSTRACT

The invention relates to a communication network having at least one network element (NE), via which data associated with the communication are conducted. The method comprises the following steps: securing, by means of a first cryptographic security function, the data (D) that are transferred from at least one first communication device (PLC1) to at least one second communication device (PLC2), pro-
(Continued)

Figure 1:
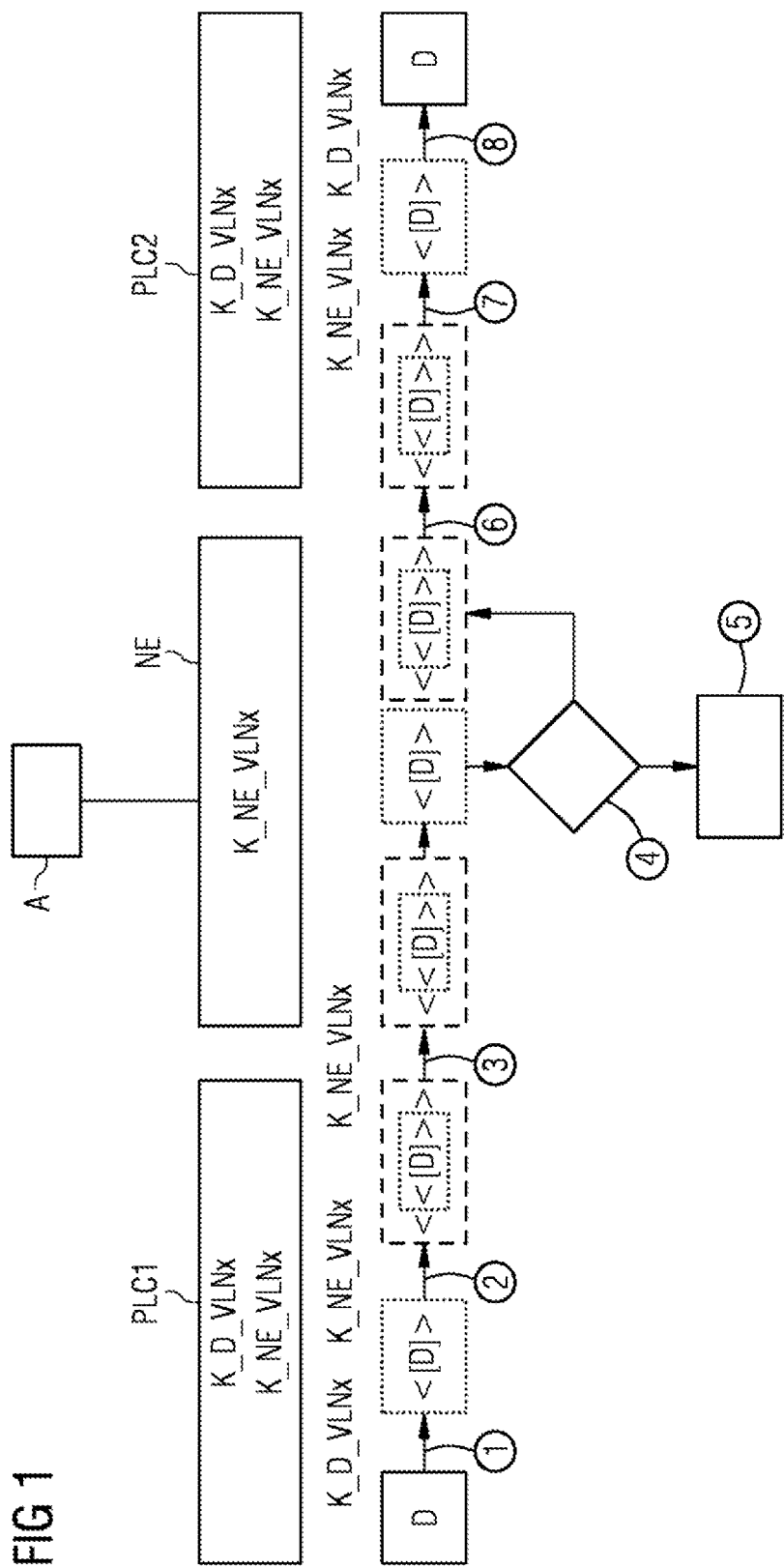

viding a second cryptographic security function, which secures, between a communication device and a network element, messages that are conducted from the first communication device to the at least second communication device via the at least one network element and that contain the data, providing a checking function by means of the at least one network element, which checking function checks the authenticity and/or integrity of the messages on the basis of the second security function, continuing (6) or stopping (5) the communication in accordance with the result of the check (4) by the checking function, wherein, if the communication is continued, the data remain secured by means of the first security function until the data are received by the at least second communication device.

16 Claims, 2 Drawing Sheets

(51) Int. Cl.
  *H04L 9/08*    (2006.01)
  *H04L 67/12*   (2022.01)
  *H04L 9/32*    (2006.01)

(56) References Cited

U.S. PATENT DOCUMENTS

| | | | |
|---|---|---|---|
| 8,943,201 B2 * | 1/2015 | Larson | H04L 29/12216 709/225 |
| 9,398,049 B2 | 7/2016 | Fries et al. | |
| 2005/0071275 A1 * | 3/2005 | Vainstein | H04L 9/0822 705/51 |
| 2008/0040606 A1 | 2/2008 | Narayanan et al. | |
| 2010/0042831 A1 | 2/2010 | Bahr et al. | |
| 2013/0159724 A1 | 6/2013 | Kim et al. | |
| 2015/0264072 A1 | 9/2015 | Savchuk et al. | |
| 2015/0304282 A1 | 10/2015 | Xu et al. | |

FOREIGN PATENT DOCUMENTS

| | | |
|---|---|---|
| CN | 105103496 A | 11/2015 |
| EP | 2304918 A1 | 4/2011 |

OTHER PUBLICATIONS

D. Naylor et al., "Multi-Context TLS (mcTLS): Enabling Secure In-Network Functionality in TLS", SIGCOMM 15, Aug. 17-21, 2015, London, UK.

Request for Comments; RFC 6407; Internet: https://www.rfc-editor.org/info/rfc6407 ; Oct. 2011.

PCT International Search Report and Written Opinion of International Searching Authority dated Jul. 4, 2018 corresponding to PCT International Application No. PCT/EP2018/061970.

MACSEC, specified in IEEE-Standard 802.1AE respectively IEEE 802.1X.

DEUTSCHE NORM DIN IEC 61784-2: Industrielle Kommunikationsnetze—Profile; Teil 2: Zusatzliche Feldbusprofile für Echtzeitnetzwerke basierend auf ISO/IEC 88002-3; Jun. 2009.

DEUTSCHE NORM DIN EN 61158-1: Industrielle Kommunikationsnetze-Feldbusses—Teil 1: Überblick und Leitfaden zu den Normen der Reihe IEC 61158 und IEC 61784; Feb. 2015.

Office Action in related Chinese Patent Application No. 201880033932.2 dated Jun. 3, 2021. 23 pages.

* cited by examiner

SECURING COMMUNICATION WITHIN A COMMUNICATION NETWORK USING MULTIPLE SECURITY FUNCTIONS

CROSS-REFERENCE TO RELATED APPLICATIONS

This application claims priority to PCT Application No. PCT/EP2018/061970, having a filing date of May 9, 2018, which is based on German Application No. 10 2017 208 735.8, having a filing date of May 23, 2017, the entire contents both of which are hereby incorporated by reference.

FIELD OF TECHNOLOGY

The following relates to a method, a communication process, a network element and a communication device for securing a communication between at least one first communication device and at least one second communication device within a real-time-capable communication network, in particular in the area of an industrial production and/or automation system, wherein the communication network has at least one network element via which data associated with the communication are routed, as well as an associated computer program (product).

BACKGROUND

In modern automation plants, IT systems are used in order to control production processes or individual production steps. In order for field instruments such as sensors and actuating elements (actuators) to be able to communicate with an automation unit in such a plant, inter alia a so-called fieldbus is used as the communication bus system, which is most often a level 2 protocol. There are standardized protocols for communication, e.g. IEC 61158. There are real-time-capable, Ethernet-based fieldbuses, which are listed, e.g., in the standard IEC 61784-2. Profibus and Profaned, Ethercat as well as Modbus are frequently used real-time-capable fieldbuses. There are further protocols, e.g. OPC-UA, S7, http, etc., on the application level (Level 7).

The security of industrial fieldbus protocols is essential in an industrial production environment. The (cryptographic) protection of intercommunicating components such as factories or equipment plays an increasingly important role in order to be able to guarantee a secure operation. By means of cryptographic security functions, objects such as integrity confidentiality or authenticity of the components can be achieved. Intentional, targeted attacks are thus repulsed.

The term "security" essentially refers to the security, confidentiality and/or integrity of data as well as their transmission and also to security, confidentiality and/or integrity when corresponding data are accessed. Inter alia authentication in the event of data transmission or the accessing of data is subsumed by the term "security". A cryptographic functionality is generally understood to be, for example, a function for encrypting, for securing the confidentiality, for securing the integrity and/or for the authentication of data (e.g. user data, control data, configuration data or administrative data). The cryptographic security functionality here can comprise, for example, one or a plurality of the functionalities listed in the following:

key storage
system and/or user authentication
attestation
encryption (with a key or group key)
decryption
calculation of a cryptographic checksum (e.g. signature)
verification of a cryptographic checksum (e.g. signature)
key agreement
key generation
generation of random numbers (e.g. seed generation)
licensing
support of system monitoring functions (e.g. tamper protection, system integrity, SIEM)
monitoring of data
validation of data
filtering of data The enumerated cryptographic functionalities here can be respectively carried out again with other/further methods or combinations of these methods.

A data interface for the transmission of data or for communication between the components, i.e. communication devices and network elements, can be, for example, a wired or wireless interface (e.g. a mobile communications interface (GSM, UMTS, LTE, 5G, or the like), a WLAN, Bluetooth, ZigBee (in particular used in home automation) or an NFC interface (NFC: Near Field Communication)). The data interface here can be configured or set up as a serial or a parallel data interface. The communication between the components is not limited to a point-to-point (peer) communication. Group communication, broadcast messages or publish/subscribe communication patterns are also conceivable.

Communication (end) devices can be field instruments, industrial control systems, industrial PCs, hand-held computer systems, pocket PC devices, mobile communication devices, smartphones, tablets and other communication devices that can process data in a computer-aided manner, processors and other electronic devices for data processing.

One measure for securing industrial components and machines is to divide them into different zones corresponding to their confidentiality and need for protection (zone model). No further security measures are generally implemented inside such a zone. The zones are mostly formed so that the communication between the components occurs within the zone and the possibility of communication with components outside one's own zone is limited. The content or nodes or components within the zone are secured and there are dedicated points of interconnection to other zones.

In view of future Industry 4.0 scenarios, these protective cell concepts are no longer adequate, as there is increasing communication beyond the zone boundaries. Such interconnection points often slow down the data flow and thus influence real-time behavior. Moreover, it should be possible to use the components in a more flexible manner in these scenarios. Statically/physically oriented solutions are thus no longer practical.

In conventional IT networks, TLS (Transport Layer Security) or IPSec (Internet Protocol Security) are often used as security protocols. TLS is defined—as its full name implies—on level 4 (Layer 4 or Transport Layer) and IPSec on level or Layer 3 (Network Layer) of the OSI reference model used in communication technology or of a similar network model such as e.g. TCP/IP stack. Level-4 protocols are thus rather unsuitable for a group communication.

In relation to TLS, D. Naylor et. al. "Multi-Context TLS (mcTLS): Enabling Secure In-Netzwork Functionality in TLS", SIGCOMM '15, Aug. 17-21, 2015, London, UK, propose an extension in the form of a multi-context TLS (mcTLS) that supports a so-called middlebox, also known as a proxy or in-path service, that can be inserted into an end-to-end connection. This middlebox is secured by means of the mcTLS. Ultimately, the network elements must then also be authenticated and are then participants of a group, which, as explained in the following, is undesirable.

U.S. Pat. No. 9,348,049 B2 discloses a method and device for the secure transmission of data. For this purpose, a session concept, which uses cryptographic methods on the application level, is described. While point-to-point connections can only be sufficiently secured on the transport level in conventional methods, a securing of the integrity and confidentiality of data can also be implemented on the application level here.

As yet, logical communication paths are not protected by cryptographic measures. A logical communication path between communication (end) devices can be realized by an identifier in data packets.

Such logical communication paths will, however, very likely be able to be secured by means of approaches such as group keys and GDOI (RFC 6407) in the future. The problem also arises here that the network elements that are not nor intended to be part of the group of the logical communication path cannot verify if the message was sent by a regular member of the group. A so-called denial-of-service attack vector results at the network element, which can exclude the end participants or communication devices from communicating in the (communication) network by means of a spate of messages. This is unacceptable when this kind of segmentation is used in an automated environment, as availability is of the utmost importance for the operators. The VLN (virtual logical networks) architecture was designed for this reason, in which groups of participants communicating via the same physical network are separated virtually. These VLN groups can obviously be secured by means of approaches such as group keys and GDOI (RFC 6407) with the disadvantage that the network elements can behave like communication devices by knowing the keys. This approach was enhanced with a mechanism in the presence of which this type of attack is no longer possible.

Potential Ethernet-based protocols are used on level 2 of the OSI reference model. The so-called data link layer (Layer 2) generally provides for an error-free data transmission and, if applicable, for a data flow control at the end of the sender and receiver. The message or data streams are normally divided into batches (also called frames). Merely one defective data transmission can be identified with the aid of checksums. There is no protection against an active manipulation. The current fieldbus protocols do not contain any security measures except for those of the aforementioned zone model.

MACSEC, which is described in the IEEE standard 802.1AE and IEEE 802.1X, works on level 2 and by default only enables a point-to-point security/encryption. In order to secure a group communication, all of the individual point-to-point connections between the network elements would have to be configured. In the event that MACSEC is to be extended for group communication, this can be compared to a specific VLN zone on level 2. However, a plurality of independent VLNs cannot be realised with this approach. Moreover, the network elements would be a member of the group and likewise subject to the aforementioned problem.

SUMMARY

An aspect relates to improving security or protective measures for communication between at least two communication end devices, which is routed via at least one network element.

The embodiments claim a method for securing a communication between at least one first communication device and at least one second communication device within a communication network, in particular in the area of an industrial production and/or automation system, wherein the communication network has at least one network element via which data associated with the communication are routed, exhibiting the following steps:

Securing the data by means of a first cryptographic security function, which are transmitted from at least one first communication device to at least one second communication device, Providing a second cryptographic security function, which secures messages between a communication device and a network element, which are routed via the at least one network element from the first communication device to the at least second communication device and which contain the data, Providing a verification function by means of the at least one network element, which verifies the authenticity and/or integrity of the messages using the second security function, Continuing or suspending the communication depending on the result of the verification by means of the verification function, wherein, in the case of the continuation of the communication, the data remain protected by means of the first security function up to their reception by the at least second communication device.

The embodiments are not limited to a point-to-point communication within the group, but rather can satisfy a point-to-multipoint communication (broadcast). It is also conceivable that a plurality of verification points are arranged in the communication network, which respectively take on the verification of authenticity and integrity for a section of the communication network and, if applicable, are coordinated by a higher authority.

The advantage of embodiments of the invention lies in the detection and repulsion of attacks in which an unauthorized attacker desires to acquire access to facilities or devices. By means of an additional, independent authentication level on the network elements, the authenticity and/or integrity of messages can be monitored.

A further advantage of embodiments of the invention lies in the fact that embodiments of the invention are not limited to the zone described in the foregoing but rather, if applicable, can be implemented over a plurality of interconnection points.

In a further embodiment of the invention, it is provided that the second security function encompasses the first security function and is cryptographically independent of the first security function.

In a further embodiment of the invention, it is provided that, for the continuation of the communication, the messages containing data still secured by means of the first security function are securely routed by means of the second security function to the at least second communication device.

In a further embodiment of the invention, it is provided that the communication between the communication devices occurs via a virtual, logically designed communication network.

In a further embodiment of the invention, it is provided that, for the communication between the communication devices, a communication protocol on level 2 of the OSI reference model used in communication technology or of a comparable network model is used.

In a further embodiment of the invention, it is provided that, for the communication between the communication devices, a communication protocol on level 3, also called the network layer, of the OSI reference model used in communication technology or of a comparable network model is used.

Communication protocols below the level 4, in particular suitable for a real-time-capable communication network, are thus preferred.

In a further embodiment of the invention, it is provided that the first security function uses a first key, in particular a first group key.

In a further embodiment of the invention, it is provided that the second security function uses a second key, in particular a second group key.

In a further embodiment of the invention, it is provided that the first key is derived from the second key.

In a further embodiment of the invention, it is provided that a secret associated with the communication devices, in particular a group secret, enters into the key derivation function.

In a further embodiment of the invention, it is provided that the data (D) can be supplemented with further data (D') before the provision of the second cryptographic security function. These additional or further data can then be modified or supplemented by authorized network elements on the communication path and secured by means of the second security function.

In this way, the data are transmitted in messages in a protected manner on the level of the network element.

A further aspect of embodiments of the invention provides a communication process for securing a communication between at least one first communication device and at least one second communication device within a communication network, in particular in the area of an industrial production and/or automation system, wherein the communication network has at least one network element, via which data associated with the communication are routed, having:
- means for securing the data by means of a first cryptographic security function, which are transmitted from at least one first communication device to at least one second communication device,
- means for providing a second cryptographic security function, which secures messages between a communication device and a network element, which are routed via the at least one network element from the first communication device to the at least second communication device and which contain the data,
- means for providing a verification function, which is designed to verify the authenticity and/or integrity of the messages using the second security function,
- means for continuing or suspending the communication depending on the result of the verification by means of the verification function,
- wherein, in the event of the continuation of the communication, the data remain protected by means of the first security function up to their reception by the at least second communication device.

In a further embodiment of the invention, it is provided that the data (D) can be supplemented with further data (D') before the provision of the second cryptographic security function. These additional or further data can then be modified or supplemented by authorized network elements on the communication path and secured by means of the second security function.

A further aspect of embodiments of the invention provides a network element suitable for supporting a secured communication between at least one first communication device and at least one second communication device within a communication network, in particular in the area of an industrial production and/or automation system, wherein data associated with the communication are routed via the network element, having:
- means for reading cryptographically secured data from cryptographically secured messages that are routed via the network element from the first communication device to the at least second communication device,
- means for providing a verification function, which is designed to verify the authenticity and/or integrity of the read messages,
- means for continuing or suspending the communication depending on the result of the verification by means of the verification function,
- wherein, in the event of the continuation of the communication, the read data, which were cryptographically secured by means of a first security function before their arrival at the network element, remain protected by means of the security function up to their reception by the at least second communication device, and
- means for providing a second cryptographic security function, which, in the event of the continuation of the communication, secures messages which are transmitted by the network element to the at least second communication device and which contain the data.

In a further embodiment of the invention, it is provided that the data (D) can be supplemented with further data (D') before the provision of the second cryptographic security function. These additional or further data can then be modified or supplemented by authorized network elements on the communication path and secured by means of the second security function.

A further aspect of embodiments of the invention provides a communication device for securing a communication with at least one further communication device within a communication network, in particular in the area of an industrial production and/or automation system, wherein the communication network has at least one network element, via which data associated with the communication can be routed, having:
- means for securing the data by means of a first cryptographic security function, which are transmitted from the communication device to at least one second communication device,
- means for providing a second cryptographic security function, which secures messages of the communication device and a network element, which are routed via the network element to the at least second communication device and which contain the data,
- wherein, depending on the result of a verification of the authenticity and/or integrity of the secured messages, in the event of a continuation of the communication, the data that are secured by means of the first security function remain secured by means of the first security function up to their reception by the at least second communication device.

In a further embodiment of the invention, it is provided that the data (D) can be supplemented with further data (D') before the provision of the second cryptographic security function. These additional or further data can then be modified or supplemented by authorized network elements on the communication path and secured by means of the second security function.

The process, device and network element can be varied/developed in accordance with the variants/embodiments of the method described above.

The units or means mentioned in the foregoing can be implemented in software, firmware and/or hardware. They can be understood as functional units that can be integrated in their function in any combination into a single unit.

A further aspect of embodiments of the invention can be a computer program or a computer program product (non-transitory computer readable storage medium having instructions, which when executed by a processor, perform actions) with at least one computer program with means for executing the method and its aforementioned variants when the computer program (product) or the at least one computer program is executed in the allotted manner within the communication process as described above.

The above devices, processes and, if applicable, the computer program (product) can be varied or developed essentially analogously to the method and its variants and embodiments.

BRIEF DESCRIPTION

Figure 2:
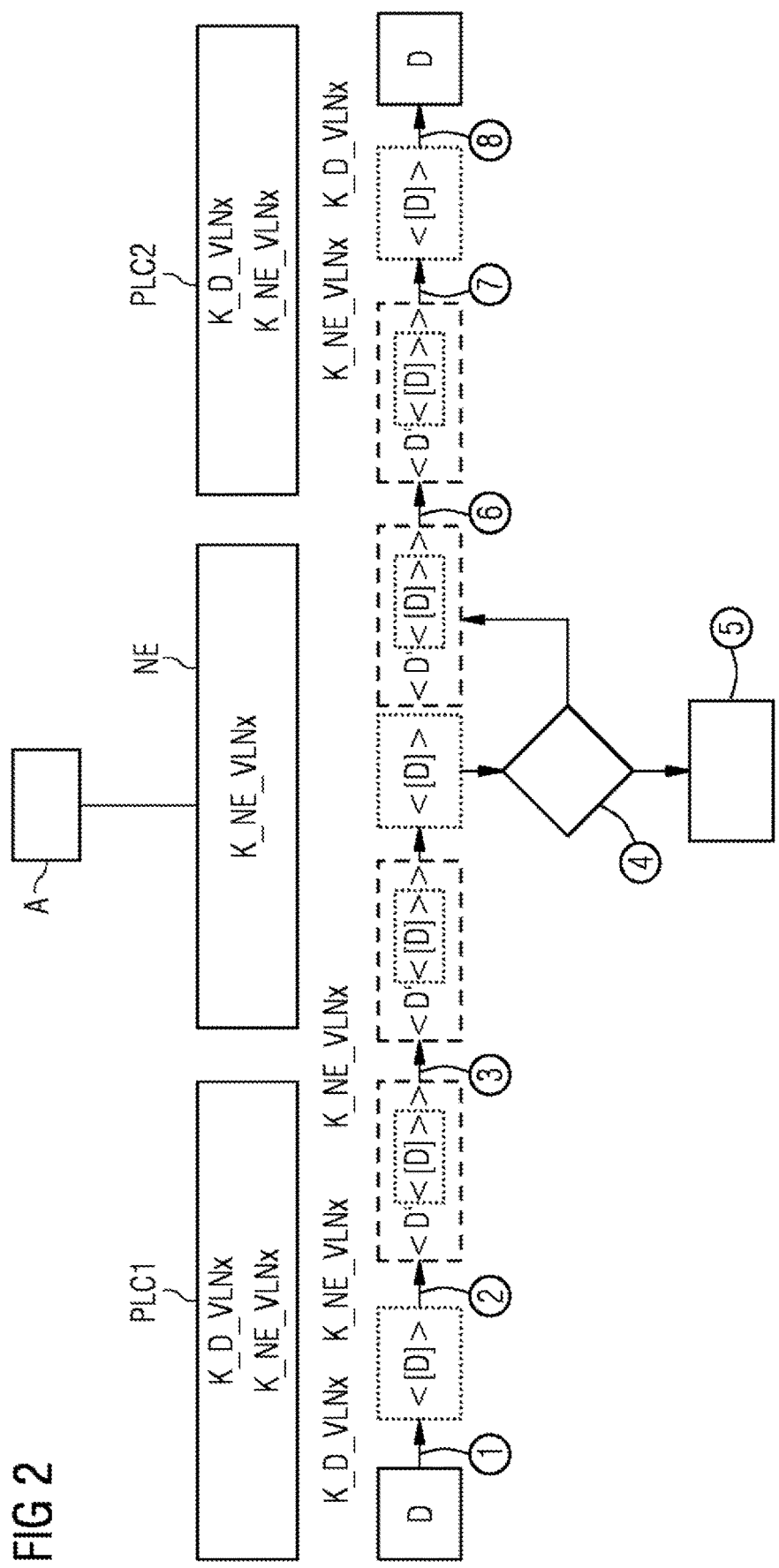

Some of the embodiments will be described in detail, with reference to the following figures, wherein like designations denote like members, wherein:

FIG. 1 shows a procedure in accordance with embodiments of the invention for verifying authenticity and/or integrity for a logical communication connection between two communication devices, wherein the data contained in the messages are routed via one or a plurality of network elements; and FIG. 2 shows a procedure in accordance with embodiments of the invention for verifying authenticity and/or integrity for a logical communication connection between two communication devices, wherein the data contained in the messages are routed via one or a plurality of network elements

DETAILED DESCRIPTION

FIGS. 1 and 2 respectively show a scenario of attack within a communication network, e.g. a virtual logical network (VLN) as described in the foregoing, in which an attacker A attempts an attack on one network element NE of a potential plurality of network elements of a communication network. By injecting messages at the network element NE, the attacker A wishes to disrupt the communication between the communication devices PLC1 and PLC2. These communication devices can be ICS components (Industrial Control System). The network element NE verifies the authentication information, e.g. MAC, of all messages arriving at the network element with dual authentication/integrity protection in order to determine whether the messages in question are from an authenticated group participant of the communication network. If this is not the case, e.g. because the attacker is injecting messages without being able to generate the correct authentication information, the data packets in question are removed and not relayed by the network element.

In FIGS. 1 and 2, the guillemets pointing to the left/right (<,>) represent messages that are authenticity/integrity-secured and the square brackets ([,]) represent data (packets) that can be confidentiality-secured.

The data are secured twice on the end-to-end or on the point-to-point transport path (dashed and dotted square).

In order to secure the messages and the data, the group participants with their communication devices PLC1, PLC2, etc., as well as the network elements, possess a special authentication key. There are several possibilities for providing this authentication information, such as e.g. MAC (Message Authentication Code), HMAC, OMAC or CBC-MAC.

For this reason, there are two specific VLN keys (K=Key) in order to secure the communication within a certain VLN. K_D_VLNx is used for confidentiality security and for authenticity/integrity security between the communication devices PLC1, PLC1. As the network elements are not regular group members in the VLN, the network elements do not require this key. The latter is reserved for end or group participants. A second key K_NE_VLNx is used for the authenticity/integrity security of the secured message and is required by both the communication devices as well as the network elements in the communication network.

The scenario of the sending of a data packet in a VLN according to FIG. 1 is explained in greater detail in the following by means of the steps 1 to 8. This scenario is also analogously valid for FIG. 2, wherein additional data D' are modified or supplemented by authorized network elements e.g. NE on the communication path and secured by the second security function.

Step 1: The data D to be sent (square with solid contour) are secured by a first security function, e.g. by application of a group key K_D_VLNx by a first communication device PLC1 (confidentiality/authenticity/integrity security). The data packet <[D]> results (dotted square). The key K_D_VLNx is only known to the regular group members of the communication network VLNx and not to the network elements e.g. NE.

Step 2: The data packet <[D]> is authenticity/integrity-secured by means of a second security function e.g. with the authentication key K_NE_VLNx. The data packet <<[D]>> results, which is sent (dashed-dotted square). The key K_NE_VLNx is known to both the communication devices of the regular group members as well as to the network elements.

As illustrated in FIG. 2, additional data D' can be modified or supplemented by authorized network elements e.g. PLC1 on the communication path and secured by the second security function. In FIG. 2, this is indicated illustratively by the dashed-dotted box containing <D' <D>>. It is also possible that the additional data D' are first supplemented by the network element NE. It is also conceivable that the additional data D' are removed again by NE or PLC2.

Step 3: The network element NE receives the data packet <<[D]>> and extracts or reads the authentication information of the second security function from the message. The outer protection can optionally be removed here. The outer protection is, however, normally not removed but rather remains in place just like the protection of the data by the first security function.

Step 4: Verification using the second security function whether the message is authentic and complete. This means, graphically speaking, that the dashed box is checked which either contains only D and may also contain D'.

Step 5: In the event the message is not authentic/complete, the data packets are rejected and the communication thus suspended.

Step 6: If the message is authentic, then the message <<[D]>> or <D' <D>> received in step 3 (dashed-dotted square) is routed/relayed via the communication network to the second communication device PLC2. The data in the dashed square thus remain protected until they reach the recipient. If the outer protection was removed in step 3, the message is again secured with a second cryptographic security function, the same authentication key K_NE_VLNx judiciously being used for protection.

In step 7: The communication device PLC2 receives the data packet <<[D]>> or <D' <D>> (dashed-dotted square) and verifies and removes the part of the data packet authenticity/integrity-secured by K_NE_VLNx.

Step 8: By means of the decryption of the data and verification of the first security function with K_D_VLNx, the communication device PLC 2 receives the actual (user) data (square with solid contour) and can be sure that the message containing the data comes from a group participant.

The network elements e.g. NE accordingly verify the authenticity/integrity of the data packets before relaying the data packets. The network element NE cannot read the data of the message itself or generate data (dotted square), as the latter are cryptographically secured by K_D_VLNx.

According to an advantageous embodiment of the invention, besides the data of the communication device within the dotted square, additional data required (read access) or modified or supplemented for the network infrastructure elements can be embedded within the dashed square but outside the dotted square and can thus be secured on the level of the network element during the transmission of the data/message.

In a further embodiment of the invention, K_D_VLNx is determined via a key derivation function e.g. KDF (S_D, K_NE_VLNx) as a function of K_NE_VLNx. The secret S_D is initially distributed once only to the communication devices of the regular group members. S_D does not necessarily have to be chosen so as to be specific or group-specific to VLNx, as a common S_D can be used for all VLNx/groups without losing the characteristic of a group-specific key e.g. K_D_VLNx. The diversity of the K_D_VLNx results from the distribution of the group-specific K_NE_VLNx to the authorized group members. During the distribution of the group keys, it is no longer necessary to distinguish between communication devices and the network elements (i.e. only K_NE_VLNx is transmitted). The management of keys is thus simplified.

Although embodiments of the invention was illustrated and described in greater detail by means of the preferred exemplary embodiment, the invention is not limited by the disclosed examples and other variations can be derived from the same by those skilled in the art without abandoning the scope of protection of embodiments of the invention.

The implementation of the processes or method sequences described in the foregoing can occur using instructions available on computer-readable storage media or in volatile computer memories (designated in the following together as computer-readable memories). Computer-readable memories are, for example, volatile memories such as caches, buffers or RAM as well as non-volatile memories such as removal storage devices, hard drives, etc.

The functions or steps described in the foregoing can be present here in the form of at least one set of instructions in/on a computer-readable memory. The functions or steps here are not bound to a particular set of instructions or to a particular form of instruction set or to a particular storage medium or to a particular processor or to particular execution schemata and can be executed by software, firmware, microcode, hardware, processors, integrated circuits, etc., operating alone or in any combination. Diverse processing strategies can be implemented here, for example serial processing by a single processor or multi-processing or multi-tasking or parallel processing, etc.

The instructions can be saved in local memories; however, it is also possible to save the instructions on a remote system and to access the same via a network.

The terms "processor", "central signal processing", "control unit" or "data evaluation means" as used here comprise processing means in the broadest sense, i.e., for example, servers, universal processors, graphic processors, digital signal processors, application-specific integrated circuits (ASICs), programmable logic circuits such as FPGAs, discrete analogue or digital circuits or any combinations of the same, including all further processing means known to those skilled in the art or developed in the future. Processors here can consist of one or a plurality of devices or apparatuses or units. If a processor consists of a plurality of devices, these can be designed or configured for parallel or sequential processing or execution of instructions.

Although the present invention has been disclosed in the form of preferred embodiments and variations thereon, it will be understood that numerous additional modifications and variations could be made thereto without departing from the scope of the intention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for securing a communication between at least one first communication device and at least one second communication device within a communication network, wherein the communication network has at least one network element, via which data associated with the communication are routed, the method comprising:
   securing the data by a first cryptographic security function, which are transmitted from at least one first communication device to at least one second communication device;
   providing a second cryptographic security function, which protects messages between a communication device and a network element which are routed via the at least one network element from the at least one first communication device to the at least one second communication device and which contain the data;
   providing a verification function by the at least one network element, which verifies an authenticity and/or an integrity of the messages using the second cryptographic security function; and
   continuing or suspending the communication depending on a result of a verification by the verification function;
   wherein, in an event of a continuation of the communication, the data remain protected by the first security function up to a reception by the at least one second communication device;
   wherein the first cryptographic security function uses a first group key, and the second cryptographic security function uses a second group key;
   wherein the first group key is derived from the second group key, and a group secret associated with the communication devices enters into a key derivation function.

2. The method according to claim 1, wherein the second security function encompasses the first security function.

3. The method according to claim 1, wherein, for the continuation of the communication, the messages containing data still secured by the first security function are securely routed by means of the second cryptographic security function to the at least one second communication device.

4. The method according to claim 1, wherein the communication between the communication devices occurs via a virtual, logically designed communication network.

5. The method according to claim 1, wherein, for the communication between the communication devices, a communication protocol on level 2 of the OSI reference model used in communication technology or of a comparable network model is used.

6. The method according to claim 1, wherein, for the communication between the communication devices, a communication protocol on level 3, which is a network layer, of the OSI reference model used in communication technology or of a comparable network model is used.

7. The method according to claim 1, wherein the first cryptographic security function uses a first group key.

8. The method according to claim 1, wherein the second cryptographic security function uses a second group key.

9. The method according to claim 1, wherein the data can be supplemented with further data before the providing of the second cryptographic security function.

10. A computing system comprising:
at least one processor;
a memory device coupled to the at least one processor; and
a computer readable storage device coupled to the processor, wherein the storage device contains program code executable by the processor via the memory device to implement a method for securing a communication between at least one first communication device and at least one second communication device within a communication network, wherein the communication network has at least one network element via which data associated with the communication are routed, the method comprising:
securing, by the at least one processor, the data by means of a first cryptographic security function, which are transmitted from at least one first communication device to at least one second communication device;
providing, by the at least one processor, a second cryptographic security function, which secures messages between a communication device and a network element, which are routed via the at least one network element from the first communication device to the at least one second communication device and which contain the data;
providing, by the at least one processor, a verification function, which is designed to verify an authenticity and/or an integrity of the messages using the second cryptographic security function; and
continuing or suspending, by the at least one processor, the communication depending on a result of a verification by the verification function;
wherein, in an event of a continuation of the communication, the data remain protected by the first cryptographic security function up to a reception by the at least one second communication device;
wherein the first cryptographic security function uses a first group key, and the second cryptographic security function uses a second group key;
wherein the first group key is derived from the second group key, and a group secret associated with the communication devices enters into a key derivation function.

11. A network element suitable for supporting a secured communication between at least one first communication device and at least one second communication device within a communication network, wherein data associated with the communication are routed via the network element, the network element comprising:
at least one hardware processor configured to:
read cryptographically secured data from cryptographically secured messages that are routed via the network element from the at least one first communication device to the at least one second communication device;
provide a verification function that is designed to verify an authenticity and/or an integrity of the read messages;
continue or suspend the communication depending on a result of a verification by the verification function;
wherein, in an event of the continuation of the communication, the read data, which were cryptographically secured before an arrival at the network element by means of a first security function, remain protected by the security function up to a reception by the at least one second communication device;
provide a second cryptographic security function, which, in an event of the continuation of the communication, secures messages which are transmitted by the network element to the at least one second communication device and which contain the data;
wherein the first cryptographic security function uses a first group key, and the second cryptographic security function uses a second group key;
wherein the first group key is derived from the second group key, and a group secret associated with the communication devices enters into a key derivation function.

12. The network element according to claim 11, wherein data is supplemented with further data before the provision of the second cryptographic security function.

13. A communication device for securing a communication with at least one further communication device within a communication network, wherein the communication network has at least one network element, via which data associated with the communication can be routed, the communication device comprising:
at least one hardware processor configured to:
secure the data by means of a first cryptographic security function, which are transmitted from the communication device to at least one second communication device; and
provide a second cryptographic security function, which secures messages of the communication device and a network element, which are routed via the network element to the at least one second communication device and which contain the data;
wherein, depending on a result of a verification of an authenticity and/or an integrity of the secured messages by the at least one network element, in an event of a continuation of the communication, the data that are secured by the first cryptographic security function remain protected by the first security function up to a reception by the at least one second communication device;
wherein the first cryptographic security function uses a first group key, and the second cryptographic security function uses a second group key;
wherein the first group key is derived from the second group key, and a group secret associated with the communication devices enters into a key derivation function.

14. The communication device according to claim 13, wherein the second cryptographic security function encompasses the first cryptographic security function.

15. The communication device according to claim 13, wherein, for the continuation of the communication, the messages containing data still secured by the first cryptographic security function can be securely relayed by the second cryptographic security function to the at least one second communication device.

16. A computer program product, comprising a computer readable hardware storage device having computer readable program code stored therein, said program code executable by a processor of a computer system to implement a method according to claim 1 when the at least one computer program is executed in the allotted manner within a communication process.

* * * * *